(12) United States Patent
Lee

(10) Patent No.: US 7,218,247 B2
(45) Date of Patent: May 15, 2007

(54) BRIEF NUMERICAL KEYPAD AND ITS OUTPUT METHOD

(76) Inventor: Chiou-Haun Lee, P.O. Box 36-80, Taichung City (TW)

( * ) Notice: Subject to any disclaimer, the term of this patent is extended or adjusted under 35 U.S.C. 154(b) by 833 days.

(21) Appl. No.: 10/645,096

(22) Filed: Aug. 21, 2003

(65) Prior Publication Data
US 2005/0040971 A1 Feb. 24, 2005

(51) Int. Cl.
H03K 17/94 (2006.01)
H03M 11/00 (2006.01)
(52) U.S. Cl. .................. 341/22; 200/5 A; 400/486
(58) Field of Classification Search .............. 341/22, 341/26; 200/5 A; 345/168; 400/486
See application file for complete search history.

(56) References Cited

U.S. PATENT DOCUMENTS 2,261,115 A * 11/1941 Hofgaard ............... 235/145 R
4,400,593 A * 8/1983 Kunz ...................... 200/5 A
5,861,588 A * 1/1999 Gillot ...................... 200/5 A

* cited by examiner

Primary Examiner—Timothy Edwards, Jr.
(74) Attorney, Agent, or Firm—Charles E. Baxley

(57) ABSTRACT

A brief numerical keypad is constructed to include four number keys aligned in X-axis and Y-axis directions and abutted against one another, each expressing one of the numbers from 1~9, a plurality of double-bridging operation portions respectively bridging the abutted area of each two adjacent number keys, each double-bridging operation portion expressing a number equal to the sum of the numerals of the respective two abutted number keys, and a plurality of triple-bridging operation portions respectively bridging the abutted area of each three adjacent number keys, each triple-bridging operation portion expressing a number equal to the sum of the numerals of the respective three abutted number keys.

20 Claims, 1 Drawing Sheet

BRIEF NUMERICAL KEYPAD AND ITS OUTPUT METHOD

BACKGROUND OF THE INVENTION

1. Field of the Invention

The present invention relates to a keypad and, more specifically, to a brief numerical keypad, which simplifies the number of keys and their arrangement.

2. Description of the Related Art

FIG. 1 shows the arrangement of a conventional numerical keypad. As illustrated, the numerical keypad comprises 10 keys ranged from "0"~"9". The keys "1"~"9" are arranged in the form of a 3×3 matrix, and the key "0" is independently disposed near the matrix. Each key has a top operation face printed with a numeral or a sign expressing a specific number, a bottom mounting face provided with signal transmission means corresponding to a respective contact at a keypad matrix circuit. When pressed one key, the corresponding contact is electrically connected, thereby causing the keypad matrix circuit to output a corresponding scan signal.

In order to let the operator accurately press every key without trigging neighbor keys, the keys are orthopedically engineered to have an about 12 mm×12 mm operation face, and spaced from one another at a pitch not less than 5 mm. However, the size of a numerical keypad must be reduced when used in a compact, small-sized electronic apparatus. When a numerical keypad made in a mini form, the operator may click a wrong key or erroneously click two keys at the same time. Further, if the operator suffers an eyesight problem, he (she) may be unable to identify the keys of a mini numerical keypad.

SUMMARY OF THE INVENTION

The present invention has been accomplished under the circumstances in view. It is the main object of the present invention to provide a brief numerical keypad, which reduces the number of keys and increases the area of the operation face of each key without affecting the decimal operation.

To achieve this and other objects of the present invention, the brief numerical keypad comprises four number keys aligned in X-axis and Y-axis directions and abutted against one another, each expressing one of the numbers from 1~9; a plurality of double-bridging operation portions respectively bridging the abutted area of two adjacent number keys, each double-bridging operation portion expressing a number equal to the sum of the numerals of the respective two abutted number keys; and a plurality of triple-bridging operation portions respectively bridging the abutted area of three adjacent number keys, each triple-bridging operation portion expressing a number equal to the sum of the numerals of the respective three abutted number keys.

DETAILED DESCRIPTION OF THE PREFERRED EMBODIMENT

Figure 2:
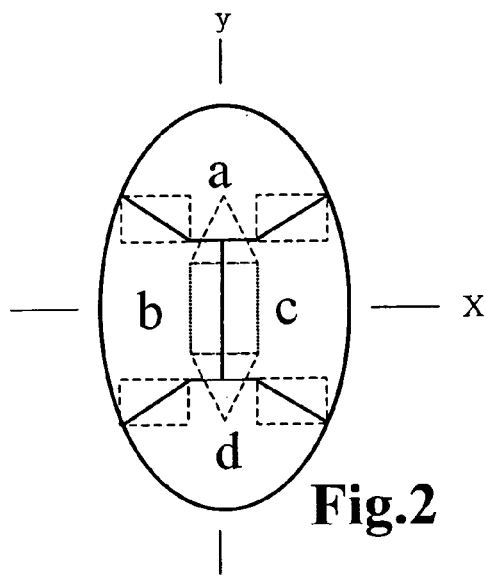
FIG. 2 is a schematic plain view showing the arrangement of keys of a brief numerical keypad according to the present invention.

Referring to FIG. 2, a brief numerical keypad in accordance with the present invention comprises:

a plurality of number keys aligned in X-axis and Y-axis directions and abutted against one another, each expressing one of the numbers from 1~9;

a plurality of double-bridging operation portions respectively bridging the abutted area of each two adjacent number keys; and a plurality of triple-bridging operation portions respectively bridging the abutted area of each three adjacent number keys.

The aforesaid brief numerical keypad employs a specific output method as outlined hereinafter:

When pressed one number key, the brief numerical keypad outputs a signal expressing one of the numerals 1~9.

When pressed one double-bridging operation portion, the brief numerical keypad outputs a signal indicative of the sum of the numerals of the pressed two number keys, which sum is not equal to either of the number keys been pressed.

When pressed one triple-bridging operation portion, the brief numerical keypad outputs a signal indicative of the sum of the numerals of the pressed three number keys, which sum is not equal to the numeral expressed by either of the number keys been pressed or the sum of the numerals of either two of the three number keys been pressed.

Figure 3:
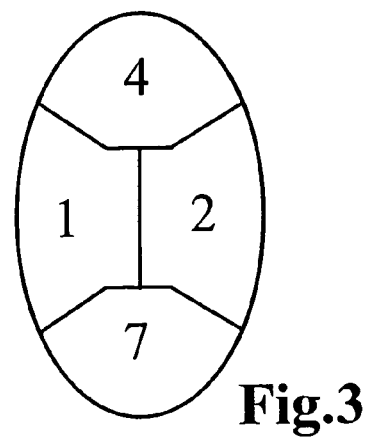
FIG. 3 is a top plain view of a brief numerical keypad according to the first embodiment of the present invention.
Figure 4:
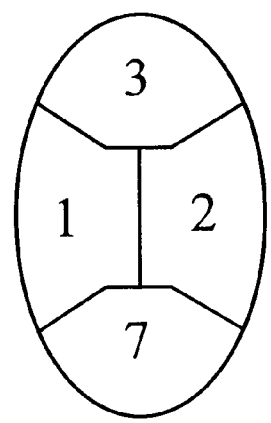
FIG. 4 is a top plain view of a brief numerical keypad according to the second embodiment of the present invention.
Figure 5:
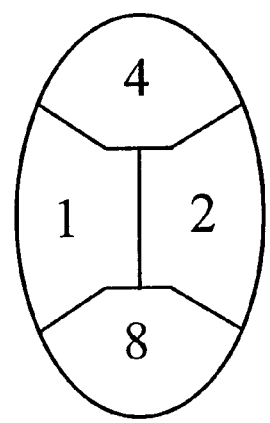
FIG. 5 is a top plain view of a brief numerical keypad according to the third embodiment of the present invention.
Figure 1:
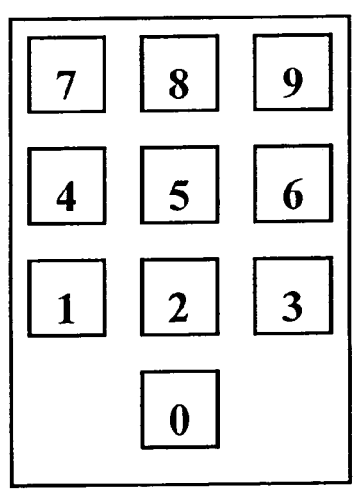
FIG. 1 is a top plain view of a numerical keypad according to the prior art.

The arrangement of the aforesaid brief numerical keypad and its output method are preferably expressed by the following example, which comprises:

four number keys (a)(b)(c)(d) arranged in X-axis and Y-axis directions and abutted against one another, each expressing one of the numbers from 1~9 (see FIGS. 3~5);

five double-bridging operation portions (b-c)(a-b)(a-c)(b-d) (c-d) respectively bridging the abutted area of each two of the four number keys (see the imaginary rectangular frames in FIG. 2); and two triple-bridging operation portions (a-b-c)(b-c-d) respectively bridging the abutted area of three adjacent number keys (see the imaginary triangular frames in FIG. 2).

FIG. 3 shows a first embodiment of the brief numerical keypad according to the present invention. According to this embodiment, the four number keys are arranged in the order of top-bottom-left-right, respectively expressing the numerals "4", "7", "1", "2". When pressed one number key, the brief numerical keypad outputs a signal expressing the corresponding numeral. For example, when pressed the number key printed with the numeral "7", the brief numerical keypad outputs a signal indicative of the value "7". When pressed one of the double-bridging operation portions (b-c) (a-b)(a-c)(b-d)(c-d), the brief numerical keypad outputs a signal indicative of the sum of the values of the two number keys been pressed. For example, when pressed the double-bridging operation portion (b-c), the brief numerical keypad outputs a signal indicative of the sum 1+2=3; when pressed the double-bridging operation portion (a-b), the brief numerical keypad outputs a signal indicative of the sum 4+1=5; when pressed the double-bridging operation portion (a-c), the brief numerical keypad outputs a signal indicative of the sum 4+2=6; when pressed the double-bridging operation portion (b-d), the brief numerical keypad outputs a signal indicative of the sum 1+7=8; when pressed the double-bridging operation portion (c-d), the brief numerical keypad outputs a signal indicative of the sum 2+7=9; when pressed the triple-bridging operation area (a-b-c), the brief numerical keypad outputs a signal indicative of the sum 4+1+2=7; when pressed the triple-bridging operation portion (b-c-d), the brief numerical keypad outputs a signal indicative of the value of the ones place of the sum 1+2+7=10. Therefore, the four number keys are sufficient to output numerals 0~9 of the decimal system.

FIGS. 4 and 5 show second and third embodiments of the brief numerical keypad. According to the second embodiment, the four number keys are arranged in the order of top-bottom-left-right respectively expressing the numerals "3", "7", "1", "2". According to the third embodiment, the four number keys are arranged in the order of top-bottom-left-right respectively expressing the numerals "4", "8", "1", "2".

According to the conventional numerical keypad design, there are ten number keys respectively expressing the numerals 0~9 of the decimal system. According to the present invention, four numeral keys are sufficient to complete the output of the numerals 0~9 of the decimal system. Therefore, the invention enables the operation face of each number key to be relatively increased without changing the total area of the brief numerical keypad.

A prototype of brief numerical keypad has been constructed with the features of FIGS. 2~5. The brief numerical keypad functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A brief numerical keypad comprising:
   a plurality of number keys respectively aligned in X-axis and Y-axis directions and abutted against one another, said number keys each respectively expressing one of the numerals from 1~9;
   a plurality of double-bridging operation portions respectively bridging the abutted area of each two adjacent number keys; and
   a plurality of triple-bridging operation portions respectively bridging the abutted area of each three adjacent number keys.

2. The brief numerical keypad as claimed in claim 1, wherein the number of said number keys is 4.

3. The brief numerical keypad as claimed in claim 2, wherein the four number keys respectively express the numerals "4", "7", "1", and "2".

4. The brief numerical keypad as claimed in claim 3, wherein said number keys comprises two number keys arranged in X-axis direction and respectively express the numerals "1" and "2", and two number keys arranged in Y-axis direction and respectively express the numerals "4" and "7".

5. The brief numerical keypad as claimed in claim 2, wherein the four number keys respectively express the numerals "3", "7", "1", and "2".

6. The brief numerical keypad as claimed in claim 5, wherein said number keys comprises two number keys arranged in X-axis direction and respectively express the numerals "1" and "2", and two number keys arranged in Y-axis direction and respectively express the numerals "3" and "7".

7. The brief numerical keypad as claimed in claim 2, wherein the four number keys respectively express the numerals "4", "8", "1", and "2".

8. The brief numerical keypad as claimed in claim 7, wherein said number keys comprises two number keys arranged in X-axis direction and respectively express the numerals "1" and "2", and two number keys arranged in Y-axis direction and respectively express the numerals "4" and "8".

9. The brief numerical keypad as claimed in claim 1, wherein each of said number keys outputs a signal indicative of the respectively expressed number when pressed.

10. The brief numerical keypad as claimed in claim 1, wherein each of said double-bridging operation portions outputs a signal indicative of the sum of the numerals respectively expressed by the corresponding two number keys when pressed.

11. The brief numerical keypad as claimed in claim 10, wherein said sum is not equal to the numeral expressed by either of the two number keys been pressed.

12. The brief numerical keypad as claimed in claim 1, wherein each of said triple-bridging operation portions outputs a signal indicative of the sum of the numerals respectively expressed by the corresponding three number keys when pressed.

13. The brief numerical keypad as claimed in claim 12, wherein said sum is not equal to the numeral expressed by either of the three number keys been pressed or the sum of the numerals respectively expressed by either two of the three number keys been pressed.

14. A brief numerical keypad output method comprising the steps of:
   (a) setting a number of number keys aligned in X-axis and Y-axis directions and keeping said number keys abutted against one another, for enabling said number keys to respectively express one of the numerals 1~9 and to output a signal indicative of the respectively expressed number when pressed;
   (b) setting the abutted area of each two adjacent number keys a double-bridging operation portion for outputting a signal indicative of the sum of the numerals respectively expressed by the corresponding two number keys when pressed; and
   (c) setting the abutted area of each three adjacent number keys a triple-bridging operation portion for outputting a signal indicative of the sum of the numerals respectively expressed by the corresponding three number keys when pressed.

15. The brief numerical keypad output method as claimed in claim 14, wherein the number of said number keys is 4.

16. The brief numerical keypad output method as claimed in claim 15, wherein the four number keys respectively express the numerals "4", "7", "1", and "2"; the number keys expressing the numerals "1" and "2" are aligned in X-axis direction; the number keys expressing the numerals "4" and "7" are aligned in Y-axis direction.

17. The brief numerical keypad output method as claimed in claim 15, wherein the four number keys respectively express the numerals "3", "7", "1", and "2"; the number keys expressing the numerals "1" and "2" are aligned in X-axis direction; the number keys expressing the numerals "3" and "7" are aligned in Y-axis direction.

18. The brief numerical keypad output method as claimed in claim 15, wherein the four number keys respectively express the numerals "4", "8", "1", and "2"; the number keys expressing the numerals "1" and "2" are aligned in X-axis direction; the number keys expressing the numerals "4" and "8" are aligned in Y-axis direction.

19. The brief numerical keypad output method as claimed in claim 14, further comprising the step (d) deducting the sum by 10 before output when the sum produced by the pressing of one double-bridging operation surpassed 10.

20. The brief numerical keypad output method as claimed in claim 14, further comprising the step (d) deducting the sum by 10 before output when the sum produced by the pressing of one triple-bridging operation surpassed 10.

* * * * *